United States Patent
Minami et al.

(10) Patent No.: US 8,015,786 B2
(45) Date of Patent: Sep. 13, 2011

(54) GUIDE MEMBER FOR A LAWNMOWER

(75) Inventors: Fumio Minami, Wako (JP); Hiroshi Hojo, Wako (JP); Hiroshi Kobayashi, Wako (JP); Kenzo Shimada, Wako (JP); Kazuki Shimozono, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/792,099

(22) Filed: Jun. 2, 2010

(65) Prior Publication Data

US 2010/0307122 A1 Dec. 9, 2010

(30) Foreign Application Priority Data

Jun. 3, 2009 (JP) ................................. 2009-134404

(51) Int. Cl.
 *A01D 67/00* (2006.01)
(52) U.S. Cl. ........................................ 56/320.2; 56/320.1
(58) Field of Classification Search ............... 56/6, 16.7, 56/16.9, 17.5, 157, 320.1, 320.2
 See application file for complete search history.

(56) References Cited

U.S. PATENT DOCUMENTS

| | | | |
|---|---|---|---|
| 4,951,449 A | | 8/1990 | Thorud |
| 5,090,183 A | * | 2/1992 | Thorud et al. .................... 56/2 |
| 5,191,756 A | * | 3/1993 | Kuhn ............................. 56/17.5 |
| 5,205,112 A | * | 4/1993 | Tillotson et al. .................... 56/2 |
| 5,210,998 A | * | 5/1993 | Hojo et al. ........................ 56/255 |
| 6,067,783 A | * | 5/2000 | Burdsall et al. ............... 56/17.3 |
| 6,751,937 B2 | * | 6/2004 | Kobayashi et al. ............. 56/202 |
| 6,862,875 B2 | * | 3/2005 | Iida et al. ..................... 56/320.2 |
| 6,874,309 B1 | * | 4/2005 | Bellis, Jr. ..................... 56/320.2 |
| 7,024,847 B2 | * | 4/2006 | Hartley ........................ 56/320.1 |
| 7,146,791 B2 | * | 12/2006 | Benway et al. ............. 56/320.2 |
| 7,574,852 B1 | * | 8/2009 | Loxterkamp et al. ........ 56/320.2 |
| 2003/0217542 A1 | * | 11/2003 | Osborne ..................... 56/320.1 |
| 2005/0028506 A1 | * | 2/2005 | Osborne et al. ............. 56/320.1 |

FOREIGN PATENT DOCUMENTS

| | | |
|---|---|---|
| GB | 2325139 | 11/1998 |
| JP | 2004-000127 | 1/2004 |

* cited by examiner

*Primary Examiner* — Thomas Will
*Assistant Examiner* — Mai Nguyen
(74) *Attorney, Agent, or Firm* — Rankin, Hill & Clark LLP

(57) ABSTRACT

A lawnmower including a cut grass storage container for storing cut grass. The lawnmower also includes a cutting blade, a downwardly-opening housing, and a cut grass conveyor passage. The cut grass storage container is provided to the cut grass conveyor passage. Grass that has been cut is delivered to the cut grass conveyor passage while revolving about a shaft inside the housing. A guide member is provided inside the housing. The guide member guides the revolving grass to the cut grass conveyor passage while guiding the grass to the outer periphery of the housing.

13 Claims, 15 Drawing Sheets

GUIDE MEMBER FOR A LAWNMOWER

FIELD OF THE INVENTION

The present invention relates to a rotary lawnmower that can be used in a bagging mode.

BACKGROUND OF THE INVENTION

A rotary lawnmower cuts grass by rotating a cutting blade along the grass, the cutting blade being housed in a housing which is open at the bottom. Such lawnmowers include lawnmowers designed to be used in a bagging mode. A lawnmower used in bagging mode stores the grass cut by the cutting blade (i.e., the cut grass) in a bag or another cut grass storage container, and since all of the cut grass can be removed, the results of cutting grass with this lawnmower are superior, and such lawnmowers are widely used in golf courses and the like. Known examples of lawnmowers that can be used in a bagging mode are disclosed in U.S. Pat. No. 4,951,449 and Japanese Patent No. 3771529.

The housing of the lawnmower disclosed in U.S. Pat. No. 4,951,449 is a bagging mode housing in which a grass discharge chute extends rearward and upward from a top wall. By attaching and removing a chute plug to and from the grass discharge chute, the bagging mode housing can be switched between bagging mode and mulching mode. In mulching mode, the cut grass is cut even finer within the housing, discharged out below the housing, and returned to the lawn.

The cutting blade cuts grass by rotating around a shaft substantially perpendicular to the lawn, and creates a revolving flow around the shaft within the housing. When the lawnmower is used in bagging mode, the cut grass is delivered to the grass discharge chute while being made to revolve around the shaft within the housing by the revolving flow. The speed of the revolving flow in the vicinity of the shaft is much lower than the speed of the revolving flow in the outer periphery of the housing. Therefore, the cut grass may stop around the shaft (a problem known as grass buildup can occur). The occurrence of grass buildup must be prevented in order for all of the cut grass in the bag from the housing to be efficiently stored in the bag via the grass discharge chute.

The lawnmower disclosed in Japanese Patent No. 3771529 can be manually switched between a bagging mode for fully opening a shutter and storing cut grass in a cut grass storage container, a mulching mode for fully closing the shutter and discharging the cut grass out below the housing, and an intermediate mode between the housing mode and the mulching mode, wherein the shutter is set to the desired open position. The lawnmower disclosed in Japanese Patent No. 3771529 has the same problems as the lawnmower disclosed in U.S. Pat. No. 4,951,449.

SUMMARY OF THE INVENTION

It is therefore an object of the present invention to provide a lawnmower in which the storage performance of storing cut grass in a cut grass storage container can be improved.

According to the present invention, there is provided a lawnmower which comprises: a cutting blade capable of rotating about a shaft extending substantially perpendicular to a lawn; a downwardly-opening housing for housing the cutting blade; and a cut grass conveyor passage extending rearwardly from the housing and designed to allow attachment of a cut grass storage container thereto, the grass cut by the cutting blade being delivered to the cut grass conveyor passage while revolving about a shaft within the housing, wherein the housing has a guide member provided therein for guiding the grass revolving about the shaft toward an outer periphery of the housing while also guiding the grass to the cut grass conveyor passage.

In the present invention, the cutting blade cuts grass and creates a revolving flow around the shaft within the housing. The grass that has been cut (in other words, the cut grass) is made to revolve around the shaft within the housing and is delivered to the cut grass conveyor passage by the revolving flow. The speed of the revolving flow in the outer periphery of the housing is higher than the speed of the revolving flow in the vicinity of the shaft. The guide member provided in the interior of the housing guides the cut grass revolving at a low speed around the shaft to the outer periphery of the housing where the revolving flow is faster, while also guiding the cut grass to the cut grass conveyor passage. Therefore, since the revolving cut grass flows smoothly, the cut grass can be prevented from stopping around the shaft (a problem known as grass buildup). Since the problem of grass buildup can be resolved, the lawnmower can be cleaned and inspected less frequently. Moreover, substantially all of the cut grass revolves at a fast speed. Substantially all of the cut grass can be quickly delivered from the housing to the cut grass conveyor passage and efficiently stored in the cut grass storage container. As a result, the storage performance with which the cut grass is stored in the cut grass storage container can be improved. Moreover, it is sufficient for the guide member to have a simple configuration of merely being provided inside the housing.

Preferably, the housing comprise a substantially horizontal top wall, an external cylinder and an internal cylinder disposed around the shaft and extending downward from the top wall, and an annular space defined by the top wall, the external cylinder and the internal cylinder. The annular space may be formed so that cut grass is directed to the cut grass conveyor passage while revolving. The guide member may be disposed in the space at a corner between the top wall and the internal cylinder, or in proximity to the corner.

In the housing, the annular space enclosed by the top wall, the external cylinder, and the internal cylinder is a passage through which the cut grass revolves, and within this passage, the guide member is disposed in the corner between the top wall and the internal cylinder or in proximity to the corner. The passage through which the cut grass revolves is formed into a downward-facing U shape. The speed of the flow which revolves through the annular passage is lowest in proximity to the internal cylinder. The guide member is disposed in the corner between the top wall and the internal cylinder or in proximity to the corner, where the flow speed is low. The guide member guides the grass revolving at a low speed to the external cylinder where the flow speed is high. Therefore, the revolving cut grass can be efficiently prevented from stopping around the shaft.

Preferably, the guide member is formed into a triangular shape which tapers in a direction opposite the direction in which the grass revolves. Consequently, the revolving flow is efficiently dispersed in the radial direction of the housing by the triangular guide member. Therefore, the cut grass revolving at a low speed can be efficiently guided in the radial direction of the housing.

Desirably, the housing has a shutter mechanism and a kicker. The shutter mechanism may be rendered capable of being switched between a bagging mode in which the cut grass conveyor passage is opened so that the grass is delivered from the housing to the cut grass storage container, and a mulching mode in which the cut grass conveyor passage is closed so that the grass is discharged out below the housing.

The kicker may be a member for regulating the revolving flow of the grass within the housing and guiding the grass to a bottom of the housing during the mulching mode, and is disposed inside the housing in a section close to the external periphery of the housing or in proximity to the section.

Specifically, the shutter mechanism opens and closes the cut grass conveyor passage. When the cut grass conveyor passage is closed by the shutter mechanism, the lawnmower switches from the bagging mode to the mulching mode. In the mulching mode, the cut grass is discharged out below the housing and returned to the lawn. The kicker is a member for regulating the revolving flow of the cut grass within the housing and guiding the cut grass to the bottom of the housing during the mulching mode, and is disposed inside the housing in the outer peripheral portion of the housing or in proximity thereto. The revolving flow and the flow of cut grass revolving within the housing are guided to the bottom of the housing by the kicker.

As described above, the kicker is positioned in the outer peripheral portion of the housing or in proximity thereto, and the kicker regulates the flow of cut grass revolving within the housing while guiding the flow downward. The guide member guides the cut grass revolving at a low speed around the shaft within the housing to the outer peripheral portion of the housing. Thus, since both the guide member and the kicker are disposed inside the housing, during the mulching mode, the flow of cut grass revolving within the housing can be dispersed so as to be uniform. Moreover, the problem of grass buildup can be prevented by the guide member. Therefore, when the lawnmower is used in the mulching mode, the cut grass can be efficiently discharged out below the housing.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
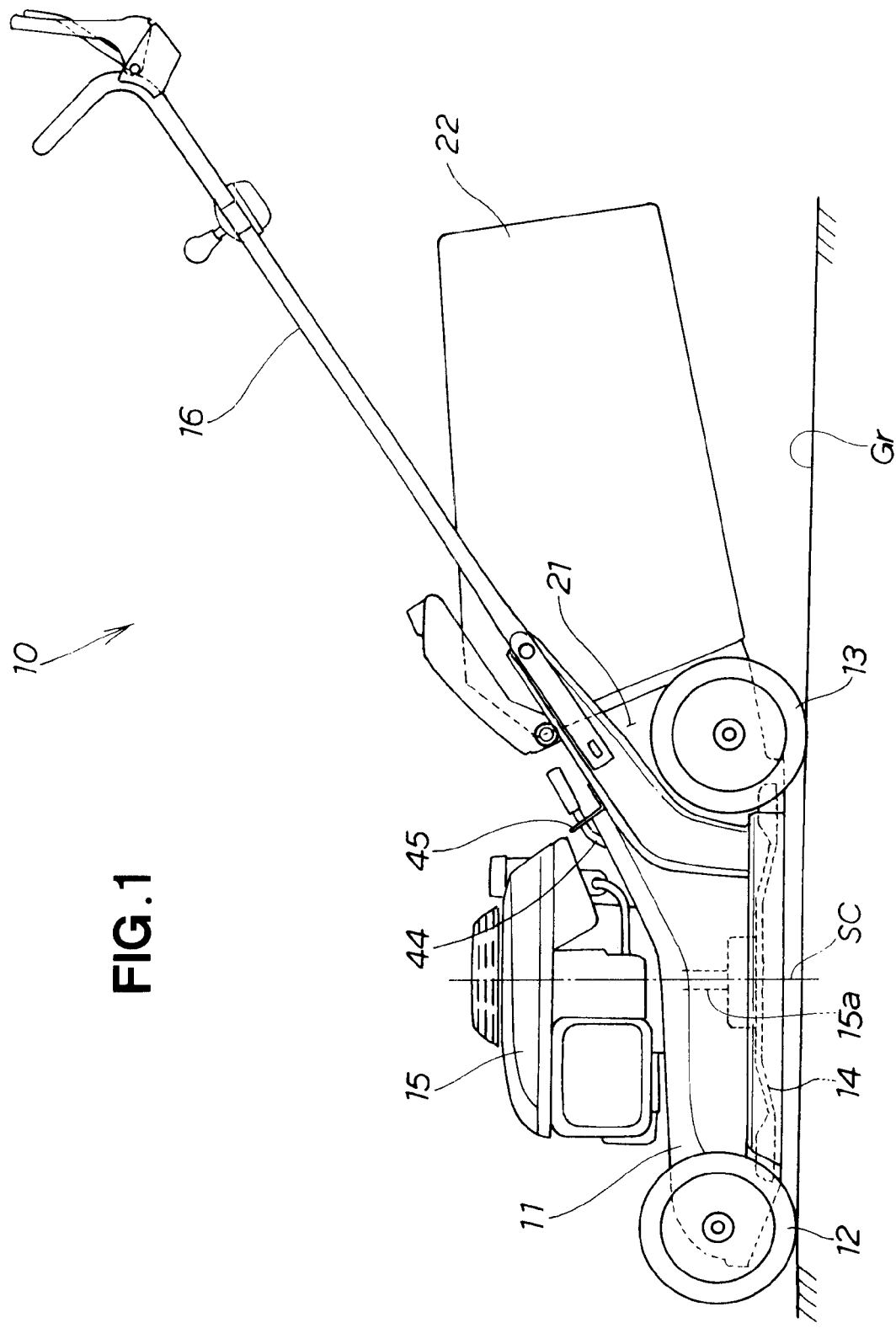
FIG. 1 is a side elevational view of a lawnmower according to the present invention.
Figure 2:
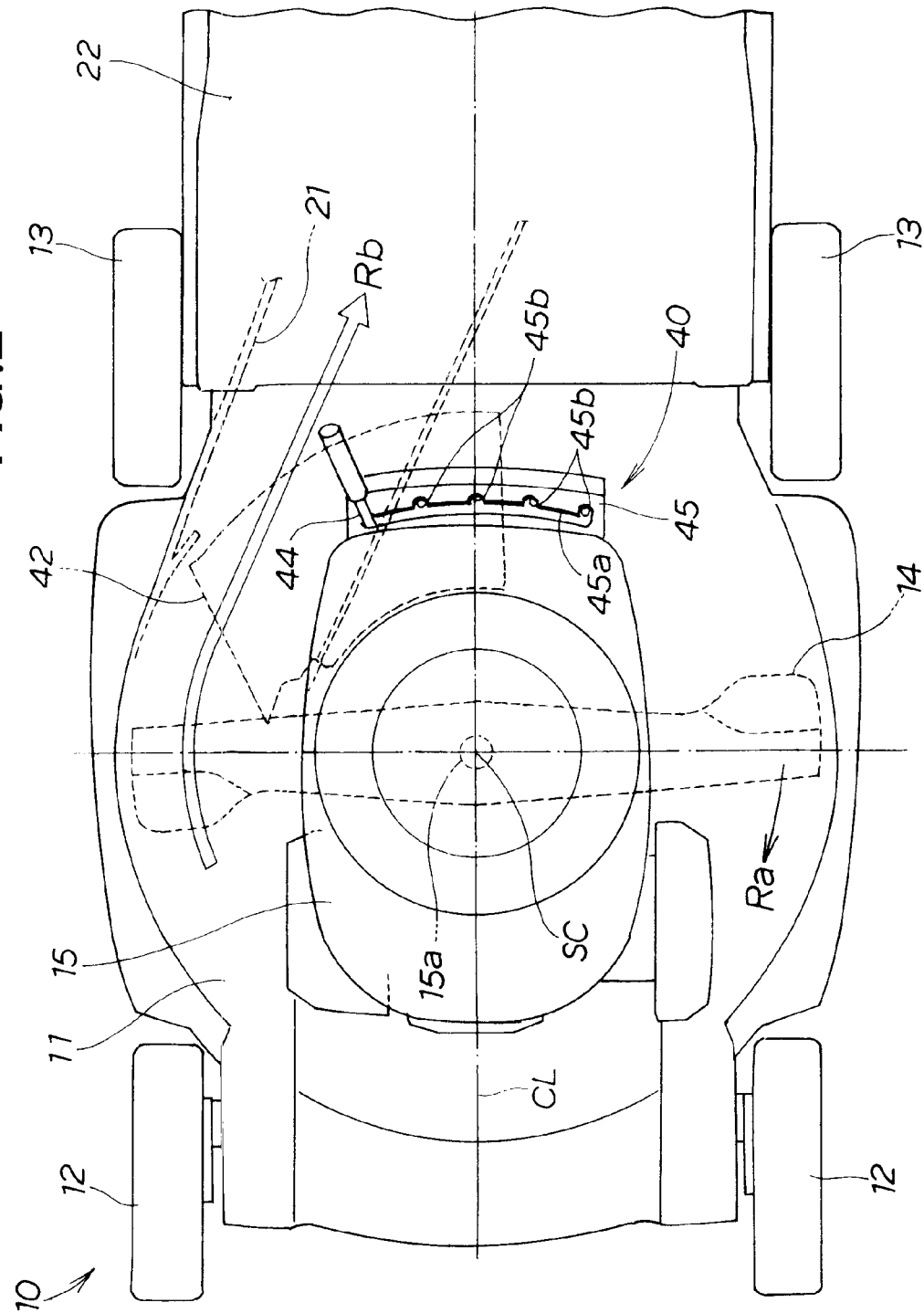
FIG. 2 is a top plan view of the lawnmower of FIG. 1.

A lawnmower 10 according to the present embodiment is a walk-behind self-propelled work machine for cutting grass, comprising a housing 11, left and right front wheels 12, 12 provided to the front part of the housing 11, left and right rear wheels 13, 13 provided to the rear part of the housing 11, a grass-cutting blade 14 housed in the central interior of the housing 11, an engine (drive source) 15 provided on the top part of the housing 11, and an operating handle 16 extending rearward from the housing 11, as shown in FIGS. 1 and 2.

In this lawnmower 10 in the plan view shown in FIG. 2, the cutting blade 14 is rotated in a clockwise direction (in the direction of the arrow Ra) by the engine 15, whereby grass is cut; an air flow (revolving flow) as indicated by the arrow Rb is created inside the housing 11, and the grass cut by the cutting blade 14 can be blown by this revolving flow into a cut grass storage container 22, where the grass is stored. The grass cut by the cutting blade 14 is hereinbelow referred to as "cut grass."

Figure 3:
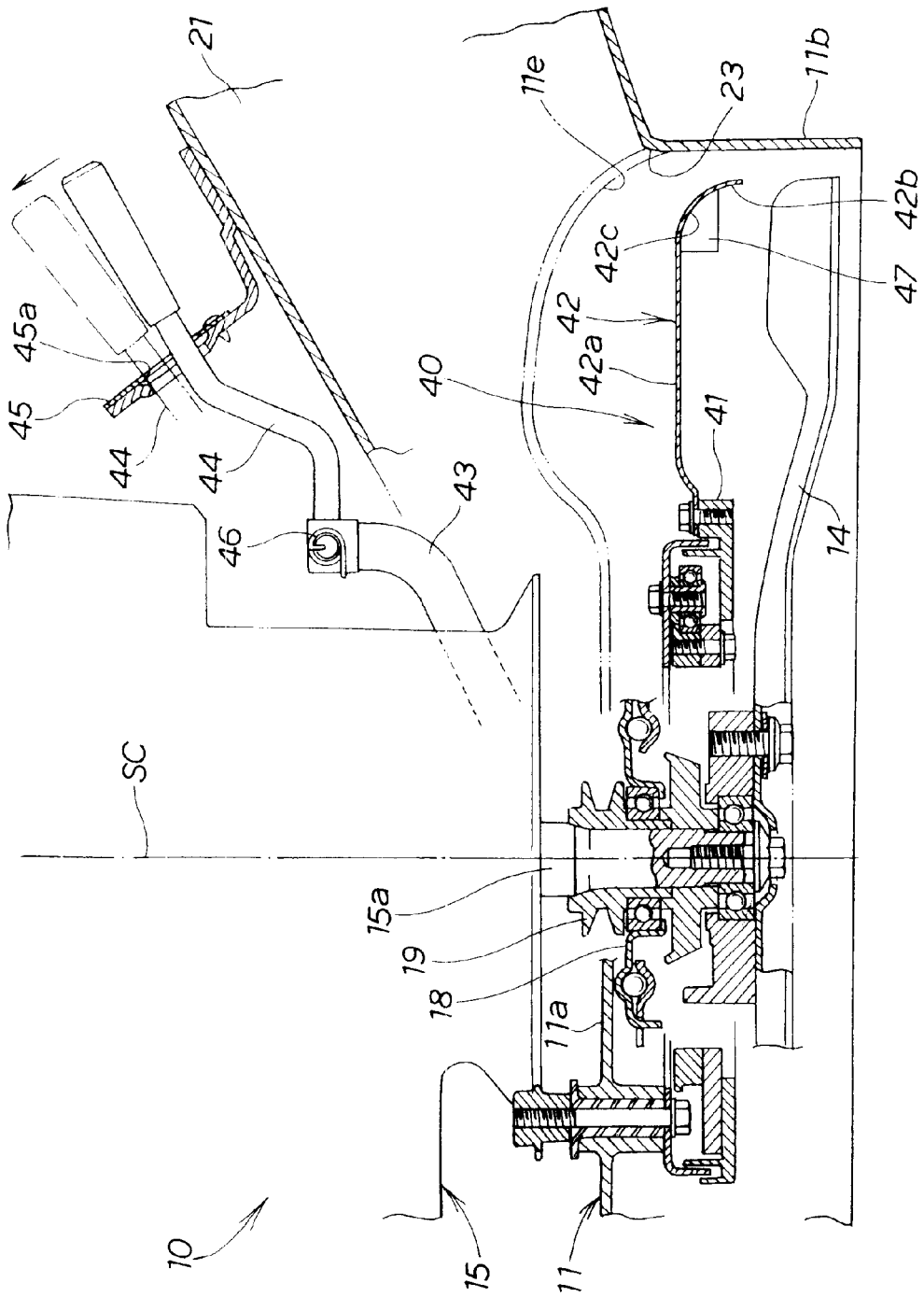
FIG. 3 is a cross-sectional view showing the lawnmower of FIG. 1.

The housing 11 also fulfills the role of a chassis, and the engine 15 is integrally assembled on the top surface of the housing by being superposed and bolted thereon, as shown in FIGS. 1 and 3. The engine 15 has an output shaft 15a extending downward from the lower end toward the lawn (ground surface) Gr (FIG. 1) into the housing 11. This output shaft 15a is a drive shaft substantially perpendicular to the lawn Gr.

Inside the housing 11 the cutting blade 14 is attached to the output shaft 15a via a clutch 18, and a drive pulley 19 for transmitting power to a continuously variable transmission (not shown) for movement is also attached to the output shaft 15a. The cutting blade 14 is driven by the engine 15 via the clutch 18, whereby the cutting blade 14 is capable of rotating about an axis SC of the output shaft 15a as a center (capable of rotating around the output shaft 15a) within the housing 11. The rear wheels 13, 13 (FIG. 1) are driven by the engine 15 via the continuously variable transmission, whereby the lawnmower 10 can be propelled forward and the grass-cutting work can proceed.

Figure 4:
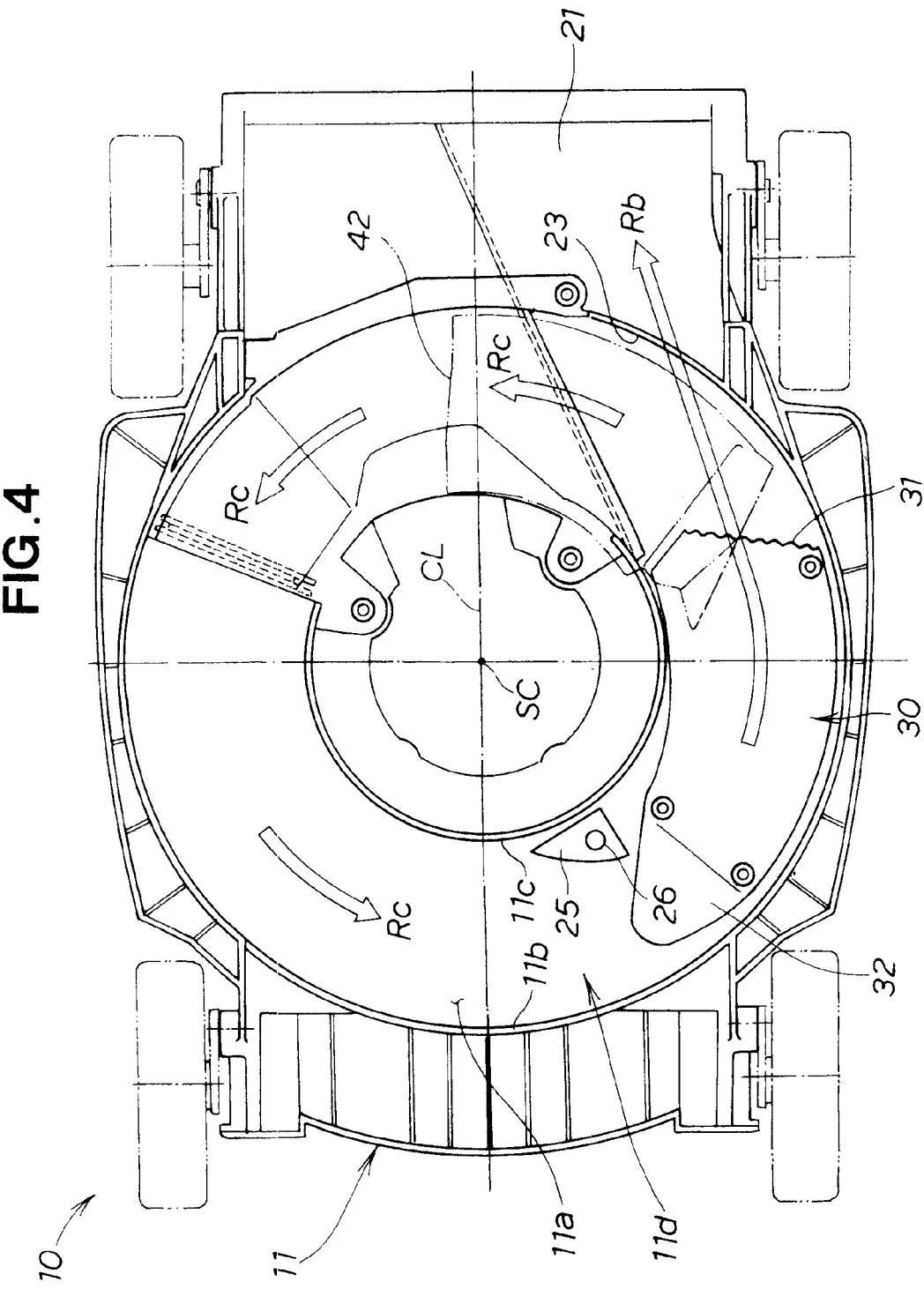
FIG. 4 is a bottom view showing the lawnmower of FIG. 1, with a cutting blade and a shutter mechanism removed.
Figure 5:
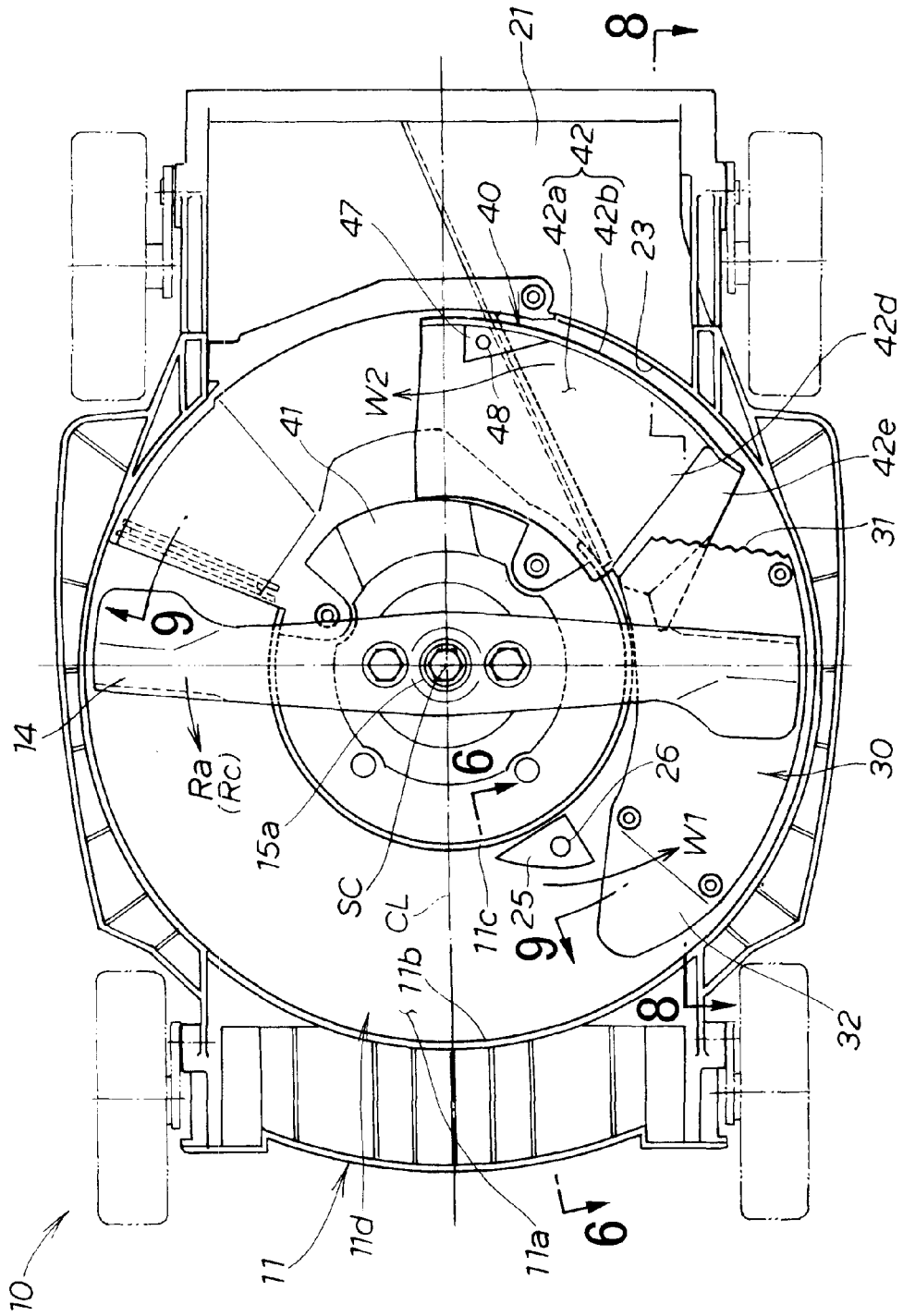
FIG. 5 is a bottom view showing the lawnmower of FIG. 1.

The details of the housing 11 are described hereinbelow. The housing 11 is a so-called downward-opening housing in which only the bottom end surface (the surface facing the lawn Gr) is fully open, as shown in FIGS. 1, 4, and 5. Moreover, the housing 11 is a spiral casing (spiral case, scroll case) having a scroll part 11d (FIG. 4).

In bagging mode, the scroll part 11d causes the grass cut by the cutting blade 14 (FIG. 5) to move in a revolving manner in the direction of the arrow Rc (revolving direction Rc) through the housing 11, and directs the grass into a cut grass conveyor passage 21 as indicated by the arrow Rb, as shown in FIG. 4.

The housing 11 is composed of a top wall 11a, an external cylinder (tubular part) 11b, an internal cylinder (tubular part) 11c, the scroll part 11d, and the cut grass conveyor passage 21, as shown in FIGS. 3 through 6. The top wall 11a closes off the top end of the housing 11, and the top wall 11a is a substantially horizontal wall having a substantially annular shape in a plan view. The external cylinder 11b is a cylindrical member centered around the output shaft 15a and extending downward from the external edge of the top wall 11a. The internal cylinder 11c is a cylindrical member centered around the output shaft 15a and extending downward from the internal edge of the top wall 11a, and is formed so as to be smaller in diameter than the external cylinder 11b.

The cut grass conveyor passage 21 is a member extending in a direction tangential to the external cylinder 11b, rearward (more specifically, rearward and upward) from the external cylinder 11b. This cut grass conveyor passage 21 has a passage opening 23 facing into the housing 11 at the front end, and a grass bag or other cut grass storage container 22 (FIG. 1) is attached at the rear end. The cut grass storage container 22 can be detached from the cut grass conveyor passage 21. The cut grass is blown to the cut grass conveyor passage 21 while revolving around the output shaft 15a inside the housing 11.

As is made clear from the above description, the direction in which the cut grass conveyor passage 21 extends from the external cylinder 11b coincides with the rotational direction Ra of the cutting blade 14. In other words, the cut grass conveyor passage 21 extends in a direction tangential to the rotational arc of the cutting blade 14. The passage opening 23 opens into the rotational direction Ra of the cutting blade 14.

Figure 6:
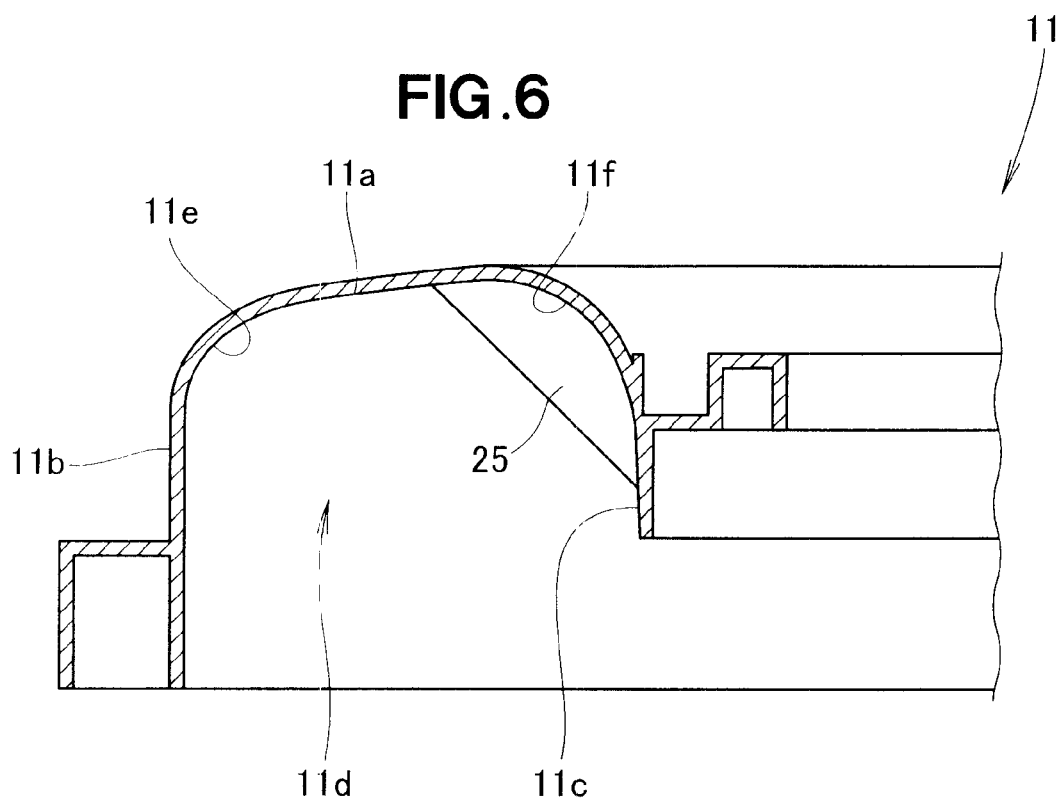
FIG. 6 is an enlarged cross-sectional view taken along line 6-6 of FIG. 5.

The scroll part 11d is a space having a substantially annular shape in a plan view, the space being enclosed by the top wall 11a, the external cylinder 11b, and the internal cylinder 11c, as shown in FIG. 6. Within this space 11d, a corner 11e (outside corner 11e) between the top wall 11a and the external cylinder 11b and a corner 11f (inside corner 11f) between the top wall 11a and the internal cylinder 11c are formed into comparatively wide arcs. The scroll part 11d is formed into a downward-facing U shape when viewed from the side and is a passage through which cut grass revolves, and is also configured so that the cut grass is directed to the cut grass conveyor passage 21 (see FIGS. 3 and 4) while revolving. In other words, the scroll part 11d leads to the passage opening 23 (FIG. 4) of the cut grass conveyor passage 21.

Figure 7:
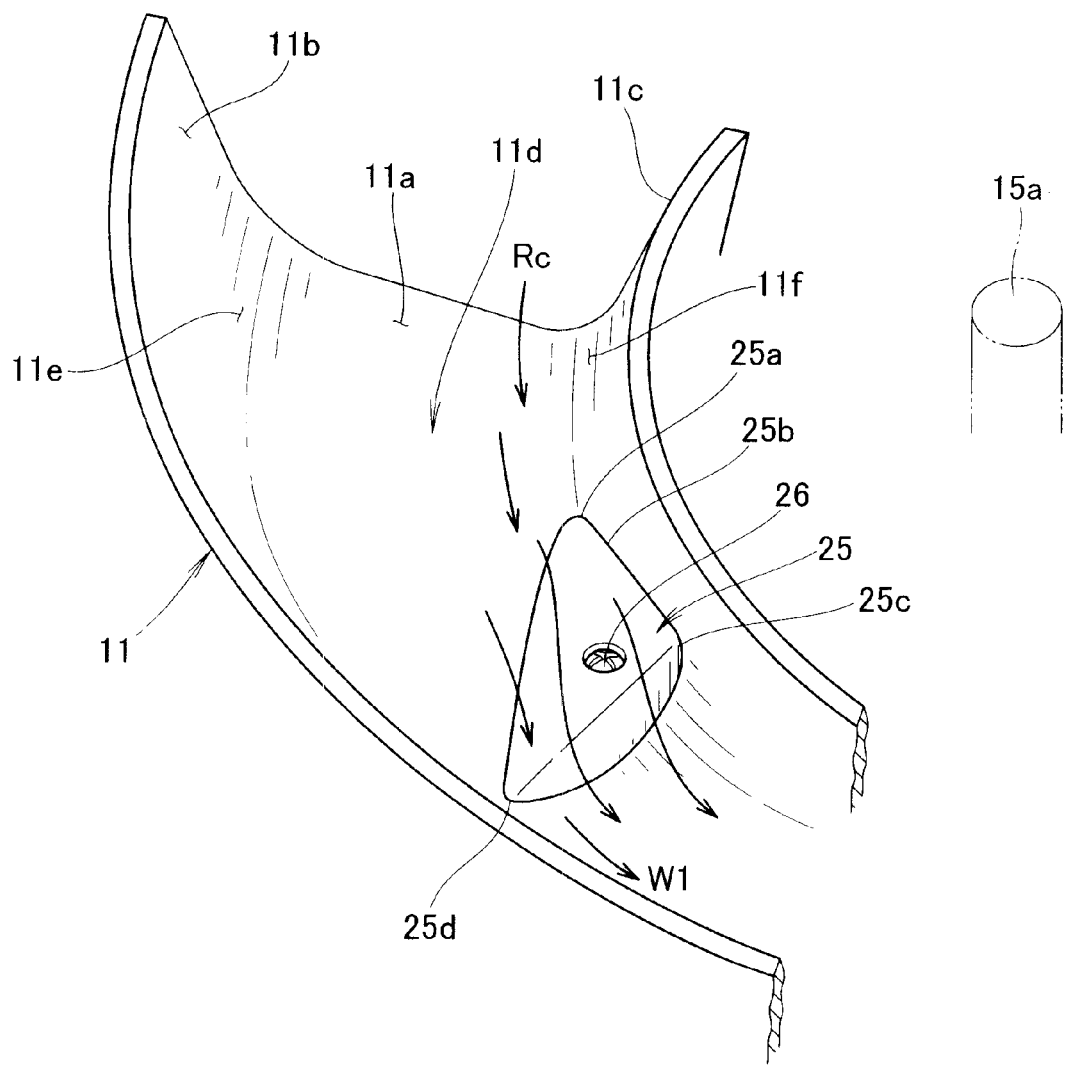
FIG. 7 is a perspective view showing a housing and a guide member of FIG. 5.

The housing 11 has a first guide member 25 in the interior, as shown in FIGS. 5 through 7. The guide member 25 guides cut grass revolving in the revolving direction Rc around the output shaft 15a into the cut grass conveyor passage 21 while guiding the cut grass toward the external periphery of the housing 11 as indicated by the arrow W1 (i.e., toward the internal peripheral surface of the external cylinder 11b), as shown in FIG. 7.

More specifically, the guide member 25 is disposed in the scroll part 11d (the passage 11d), in the inside corner 11f or in proximity thereto. For example, the entire guide member 25 is firmly bonded to the inside surface of the scroll part 11d, and is attached to the top wall 11a by a screw 26, or by welding, caulking, or other various attachment configurations. This type of guide member 25 is formed so as to have a substantially triangular shape in both a plan view (underside view as well) and a side view, so as to taper in the direction opposing the revolving direction Rc in which the cut grass revolves, i.e., in the opposite direction of the revolving direction Rc.

When the housing 11 is viewed from the bottom side, the guide member 25 has the following configuration.

A tapering distal end 25a in the guide member 25 is positioned in the inside corner 11f. One side 25b in the triangular guide member 25 is connected along the external side of the internal cylinder 11c. This side 25b is inclined so that the part in the tapering distal end 25a is nearest to the top wall 11a, and as the side moves in the revolving direction Rc it becomes progressively farther away from the top wall 11a. The part in the side 25b at the rear end 25c is farthest from the top wall 11a.

When the housing 11 is viewed from the bottom side, the three apexes of the triangular guide member 25 are defined as follows. The tapering distal end 25a is referred to as the "first apex 25a." The rear end 25c is referred to as the "second apex 25c." The remaining end 25d is referred to as the "third apex 25d." The third apex 25d is in contact with the top wall 11a.

The revolving current flow is efficiently dispersed in the radial direction of the housing 11 by the substantially triangular guide member 25. Therefore, in the vicinity of the inside corner 11f, cut grass revolving at a low speed can be efficiently guided in the radial direction of the housing 11 (radially outward with respect to the internal cylinder 11c).

Figure 8:
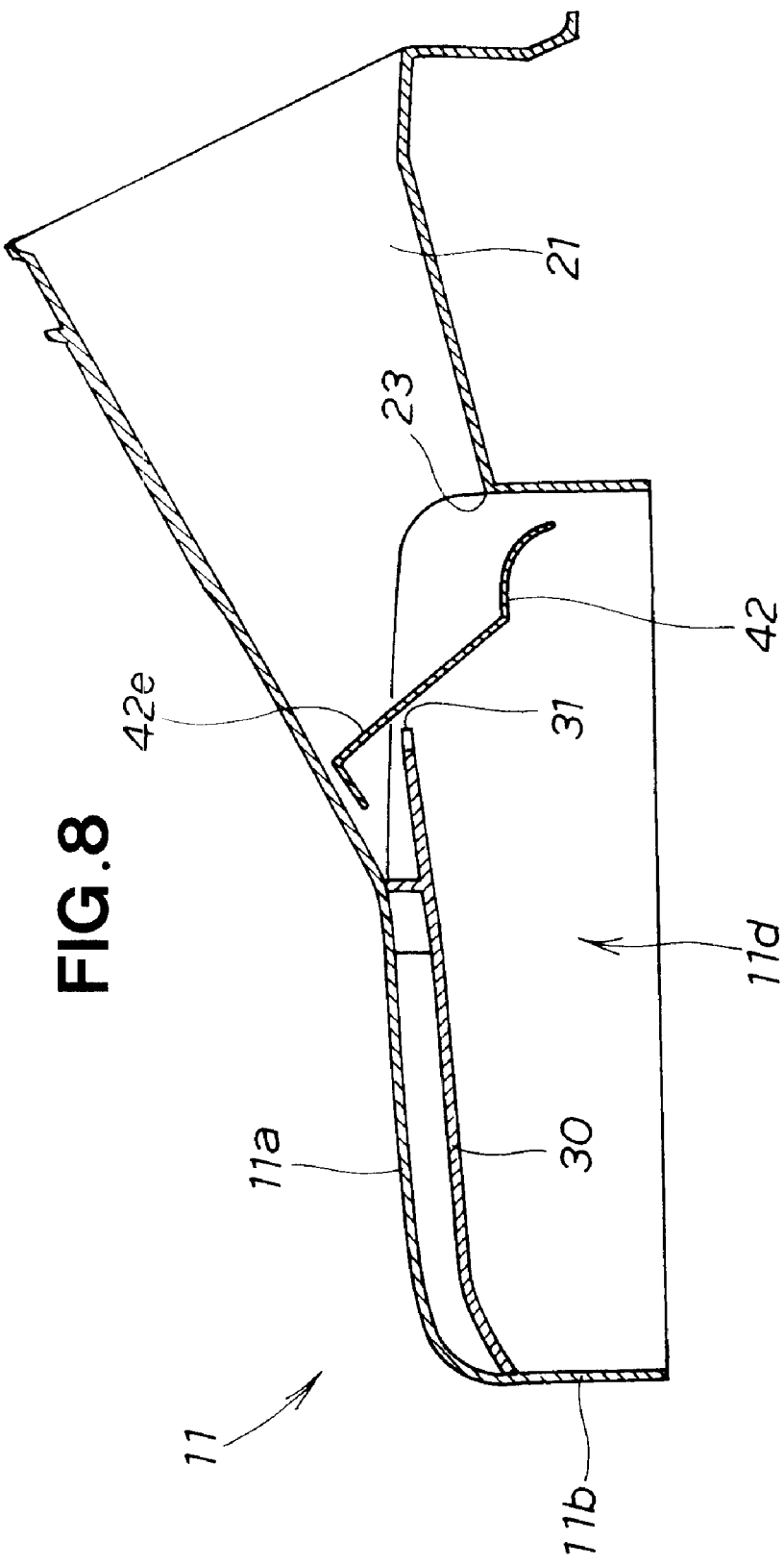
FIG. 8 is a cross-sectional view taken along line 8-8 of FIG. 5.
Figure 9:
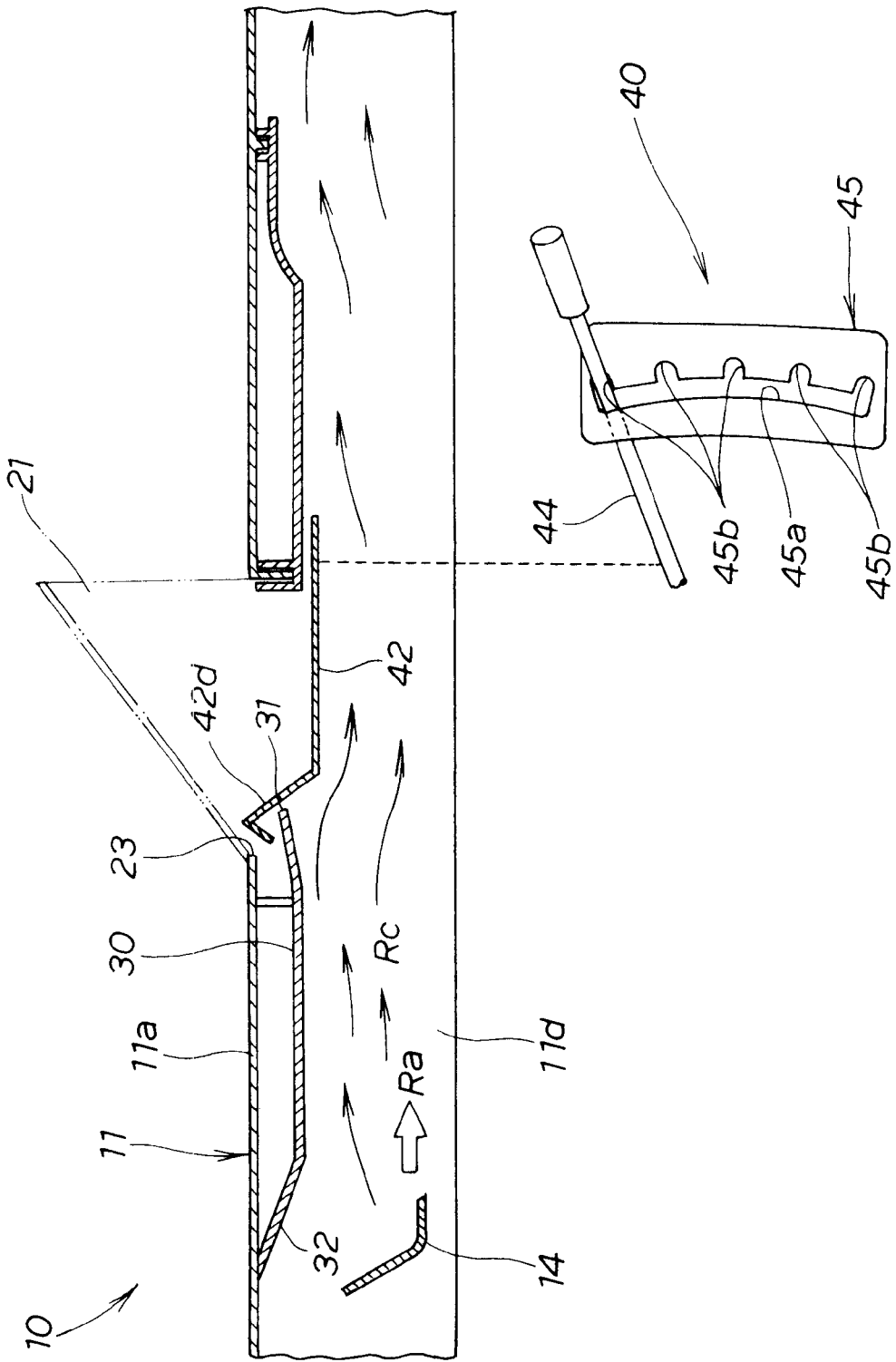
FIG. 9 is a cross-sectional view taken along line 9-9 of FIG. 5.

Furthermore, in the housing 11, a second guide member 30 is disposed along the scroll part 11d as shown in FIGS. 5, 8, and 9. This guide member 30 is provided on the bottom side of the top wall 11a of the housing 11, and a guiding-direction rear edge 31 is made to face the passage opening 23. As a result, the cross-sectional shape of the housing 11 passing through the axis SC is substantially uniform between the portion having the scroll part 11d and the portion not having the scroll part 11d. Therefore, in mulching mode, the cut grass can be sufficiently moved in a revolving motion in the revolving direction Rc within the housing 11. Work in mulching mode can be efficiently performed.

A shutter mechanism 40 is provided on the internal peripheral surface of the housing 11 (the internal peripheral surface of the external cylinder 11b) as shown in FIG. 3. The shutter mechanism 40 is composed of a rotating disc 41 rotatably attached to the top wall 11a inside the housing 11, a shutter body 42 attached to the outside edge of the rotating disc 41, an arm 43 attached at the proximal end to the rotating disc 41, an operating lever 44 connected to the distal end of the arm 43, and an operation guider 45 provided in the top surface of the rear part of the housing 11. The rotating disc 41 is an annular horizontal plate positioned on the same axis as the axis SC.

The rotating disc 41 and the shutter body 42 are moveable components positioned inside the housing 11. When the rotating disc 41 and the shutter body 42 in the shutter mechanism 40 are hereinafter referred to collectively, they will be referred to as the "moveable components 41, 42" positioned inside the housing 11.

Figure 10:
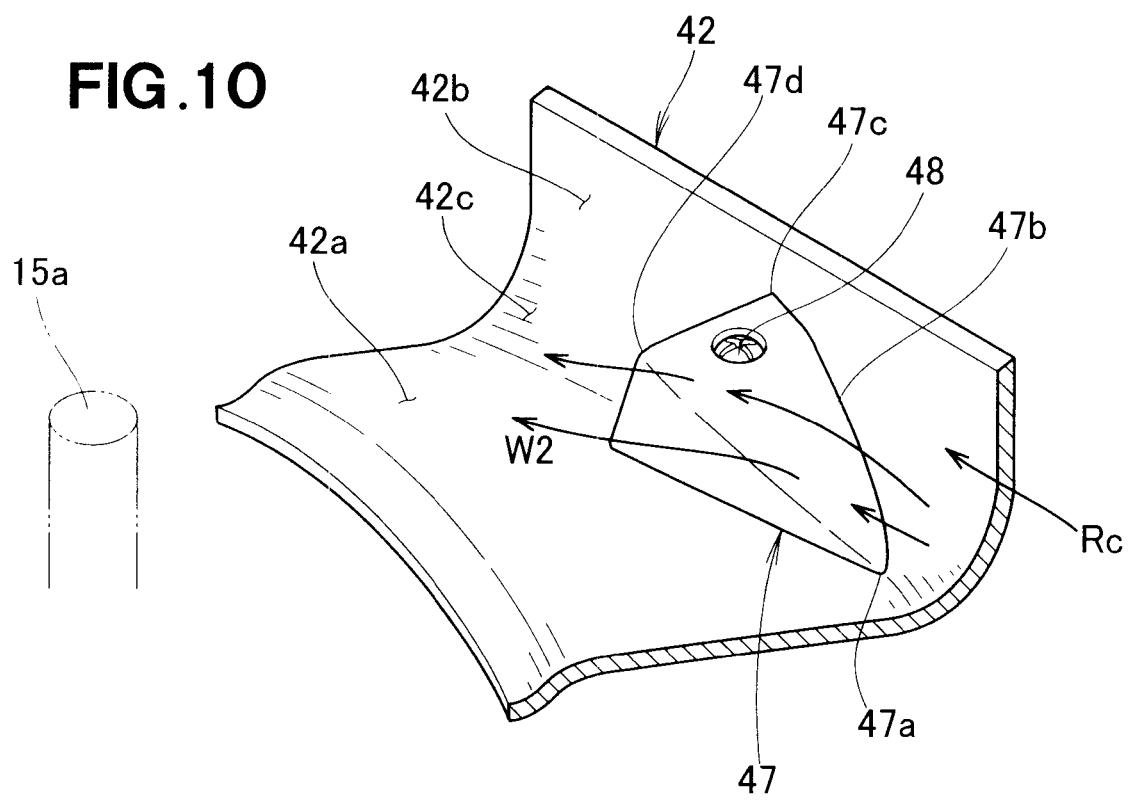
FIG. 10 is a perspective view showing a shutter body and a kicker of FIG. 5.

The shutter body 42 is a component obtained by bend-molding a plate material, and is composed of a horizontal section 42a extending from the outside edge of the rotating disc 41 toward the external cylinder 11b of the housing 11, and a vertical section 42b curving from the distal end of the horizontal section 42a and falling along the internal peripheral surface of the external cylinder 11b, as shown in FIGS. 3, 5, and 10. The corner 42c between the horizontal section 42a and the vertical section 42b is formed into a comparatively wide arc shape matching the outside corner 11e of the scroll part 11d. The entire shape of the shutter body 42 is substantially a fan shape centered around the axis SC when the shutter body 42 is viewed from below. Such a shutter body 42 is capable of rotating together with the rotating disc 41 around the axis SC.

The operating lever 44 is attached to the arm 43 such that the lever can swing vertically and the horizontal swinging of the lever is restricted, as shown in FIG. 3. Furthermore, the operating lever 44 is urged toward a neutral position shown by the solid lines by a return spring 46. The operation guider 45 has a horizontally long guiding oblong hole 45a through which the operating lever 44 passes, and a plurality (e.g. five) of positioning grooves 45b provided along the guiding oblong hole 45a, as shown in FIGS. 2 and 3. The operation of the operating lever 44 can be guided by the operation guider 45. The position of the positioning groove 45b at one end of the guiding oblong hole 45a designates the fully closed position, and the position of the positioning groove 45b at the other end of the guiding oblong hole 45a designates the fully open position. The intervals of the positioning grooves 45b are preferably set so that the open position of the shutter body 42 changes in 25% intervals, for example.

As is made clear from the above description, the shutter mechanism 40 has a shutter body 42 provided in the passage opening 23 which faces into the housing 11 in the cut grass conveyor passage 21. The shutter body 42 is capable of pivoting about the axis SC of the output shaft 15a as a pivotal center. The passage opening 23 can be opened and closed and the open position can be adjusted by the shutter body 42. The shutter body 42 can be pivotably operated by the operating lever 44.

FIG. 8 shows that the cut grass conveyor passage 21 extends rearward and upward from the housing 11; and also that in the scroll part 11d, the guide member 30 is provided at a fixed distance below the top wall 11a, and the height of the guiding-direction rear edge 31 of the guide member 30 is set to a higher position than the bottom end of the passage opening 23. The guiding-direction rear edge 31 faces toward the passage opening 23.

FIG. 9 shows an expanded view of the relationship between the housing 11, the cutting blade 14, the passage opening 23 of the cut grass conveyor passage 21, the guide member 30, and the shutter body 42. The height of the guide member 30 in the scroll part 11d is substantially the same as the height of the shutter body 42. Therefore, although the cut grass conveyor passage 21 is provided to the housing 11 and the shutter body 42 is provided to the scroll part 11d, changes in the cross section of the scroll part 11d (changes in the cross-sectional shape or size) are comparatively small. As a result, the air and cut grass can be made to move smoothly and sufficiently in a revolving motion through the scroll part 11d.

In the shutter body 42, a superposed section 42e folded up into the area above the guide member 30 is integrally formed on an opening/closing distal end 42d facing the guiding-direction rear edge 31 of the guide member 30, as shown in FIGS. 5, 8, and 9. Therefore, when the shutter body 42 is fully closed, part of the superposed section 42e is vertically superposed over the guiding-direction rear edge 31. The distal end 32 of the guide member 30 is inclined so that the end is in contact with the bottom surface of the top wall 11a.

The shutter mechanism 40 has a kicker 47 on the moveable components 41, 42 positioned inside the housing 11, as shown in FIGS. 3, 5, and 10. This kicker 47 is a member for regulating the revolving flow of cut grass inside the housing 11 and guiding the cut grass to the bottom of the housing 11 in mulching mode. In other words, the kicker 47 guides the cut grass revolving in the revolving direction Rc about the output shaft 15a to the interior of the housing 11 (the external peripheral surface of the internal cylinder 11c) as indicated by the arrow W2, and also to the bottom of the housing 11. The kicker 47 fulfilling this type of role is positioned inside the housing 11 in a section of the housing 11 near the external periphery, i.e., on the internal peripheral section of the external cylinder 11b or in proximity thereto (more specifically, positioned in the outside corner 11e or in proximity thereto).

To be more specific, the kicker 47 is provided to the shutter body 42 and is positioned in the corner 42c between the horizontal section 42a and the vertical section 42b or in proximity to the corner, as shown in FIG. 10. For example, the entire kicker 47 is firmly bonded to the shutter body 42, and is attached to the horizontal section 42a by a screw 48, or by welding, caulking, or other various attachment configurations. When the shutter mechanism 40 (FIG. 5) is switched to bagging mode, the kicker 47 and the shutter body 42 together become positioned away from the cut grass conveyor passage 21 (FIG. 5). This type of kicker 47 is formed so as to have a substantially triangular shape in both a plan view (underside view as well) and a side view, so as to taper in the direction opposing the revolving direction Rc in which the cut grass revolves, i.e., in the opposite direction of the revolving direction Rc.

When the housing 11 (FIG. 3) is viewed from the bottom side, the kicker 47 has the following configuration.

A tapering distal end 47a in the kicker 47 is positioned in the corner 42c between the horizontal section 42a and the vertical section 42b. One side 47b in the triangular kicker 47 is connected along the external side of the vertical section 42b. This side 47b is inclined so that the part in the tapering distal end 47a is nearest to the horizontal section 42a, and as the side moves in the revolving direction Rc it becomes progressively farther away from the horizontal section 42a. The part in the side 47b at the rear end 47c is farthest from the horizontal section 42a.

When the housing 11 (FIG. 3) and the kicker 47 are viewed from the bottom side, the three apexes of the triangular kicker 47 are defined as follows. The tapering distal end 47a is referred to as the "first apex 47a." The rear end 47c is referred to as the "second apex 47c." The remaining end 47d is referred to as the "third apex 47d." The third apex 47d is separated farthest from the horizontal section 42a, similar to the second apex 47c.

Thus, the kicker 47 has a substantially triangular shape in a plan view, which tapers in a direction opposing the revolving direction Rc in which the cut grass flows. The revolving current flow is efficiently dispersed in the radial direction of the housing 11 (the direction of the internal cylinder 11c shown in FIG. 5) by the substantially triangular kicker 47. Therefore, cut grass revolving at a high speed can be efficiently guided in the radial direction of the housing 11 shown in FIG. 5.

Figure 11:
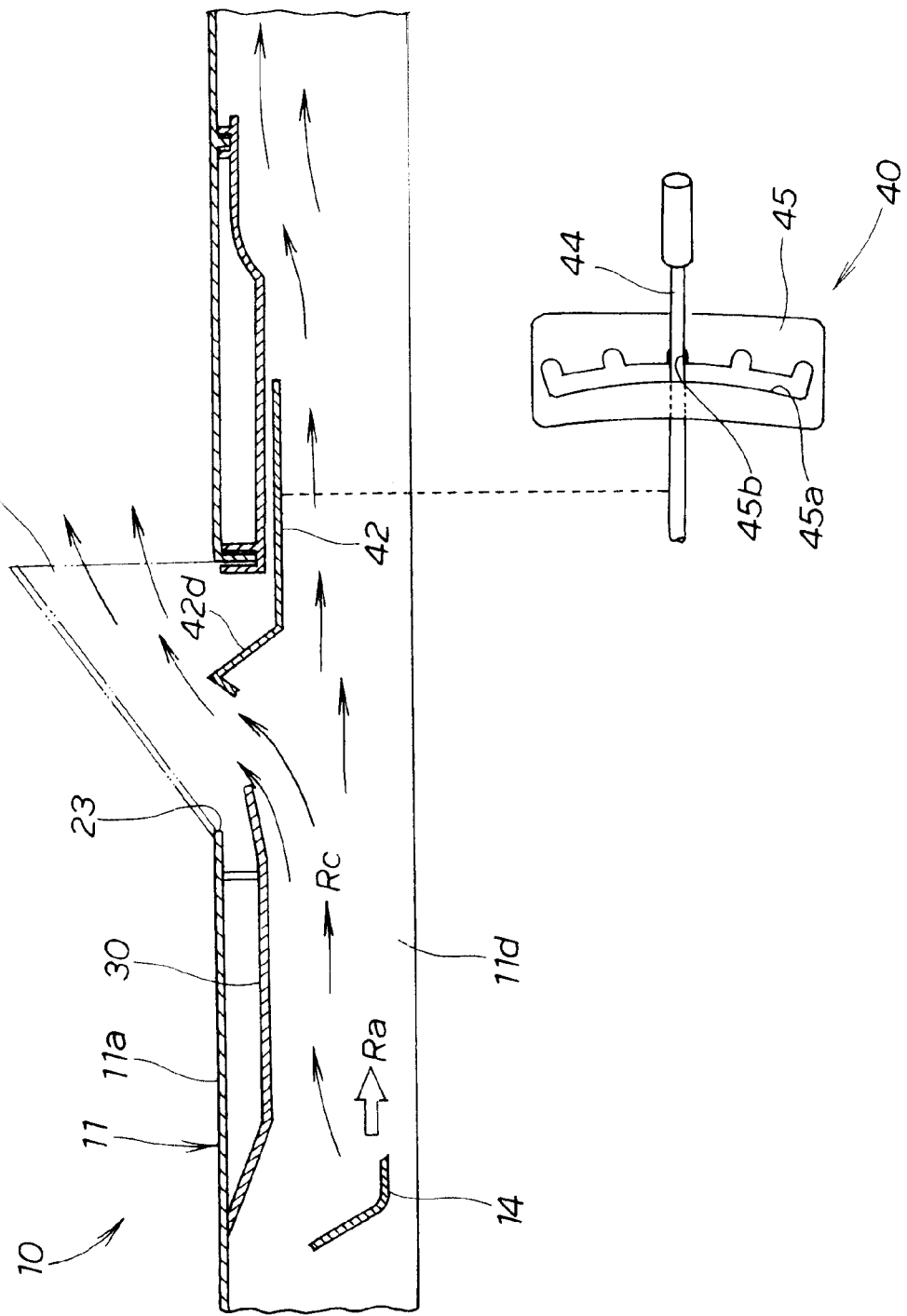
FIG. 11 is a schematic view showing the shutter body of FIG. 9 placed in a half-open position.
Figure 12:
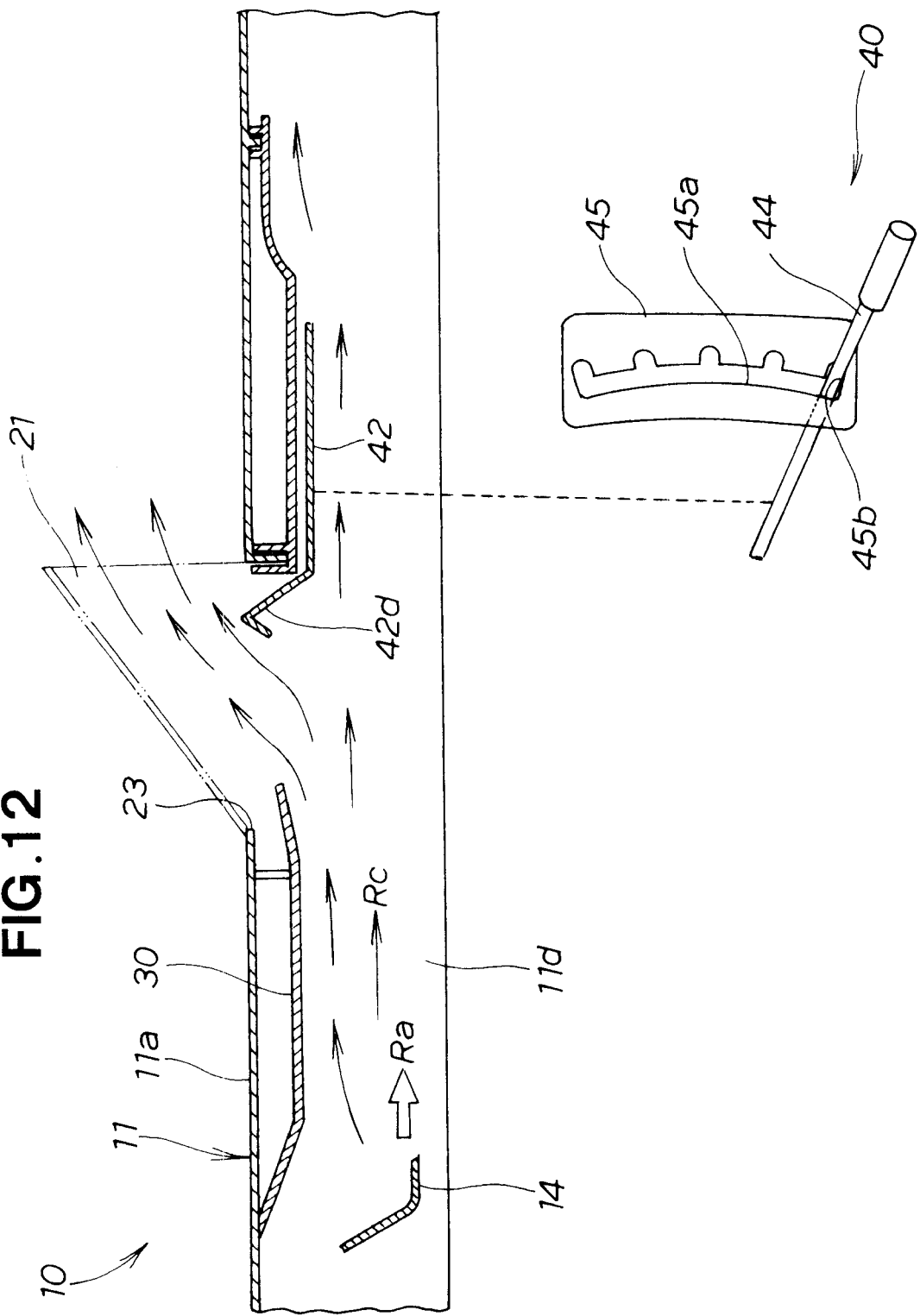
FIG. 12 is a schematic view showing the shutter body of FIG. 9 placed in a fully open position.
Figure 13:
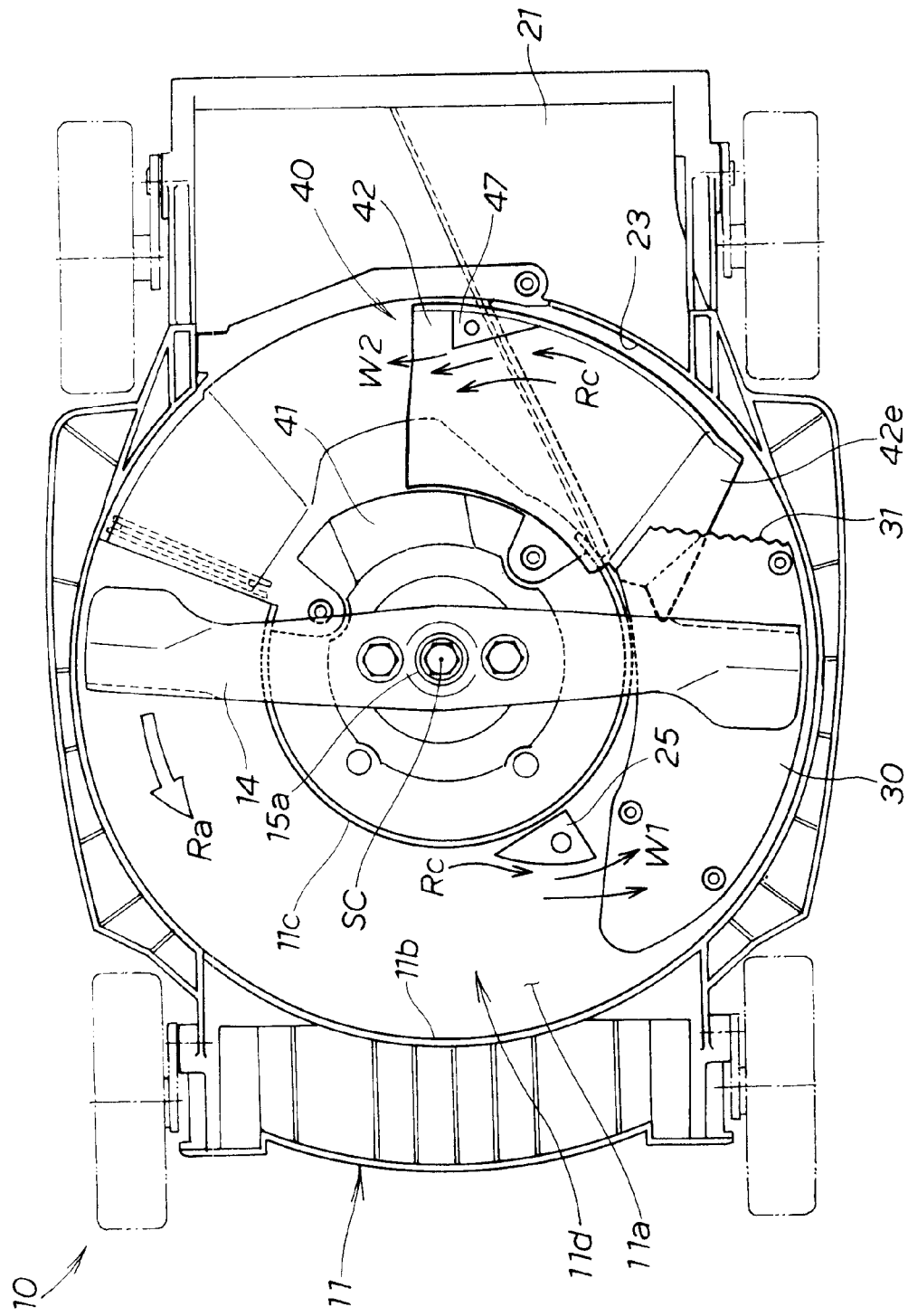
FIG. 13 is a view showing the shutter body of FIG. 5 placed in a fully closed position.
Figure 14:
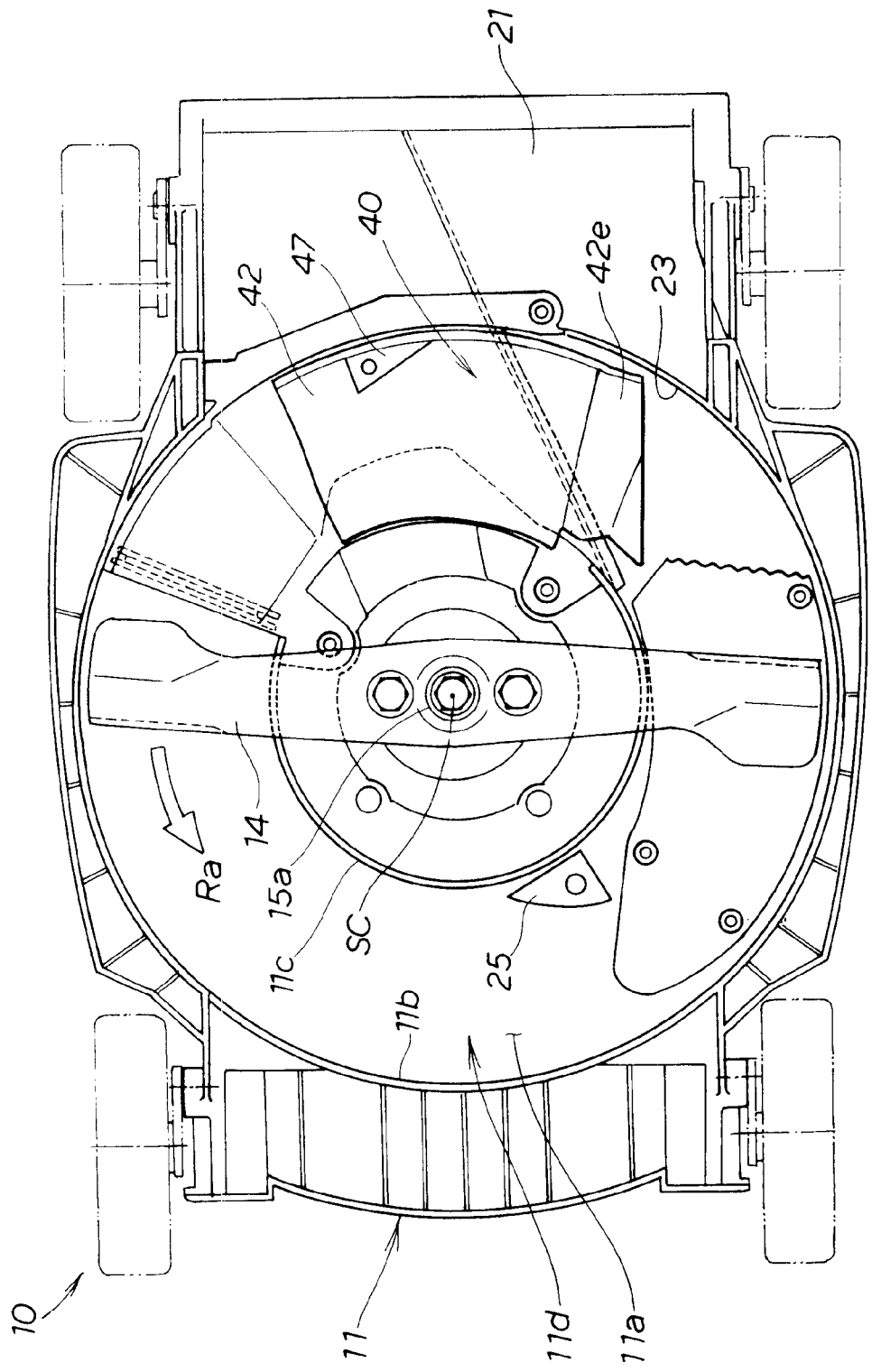
FIG. 14 is a view showing the shutter body of FIG. 5 placed in a half-open position.
Figure 15:
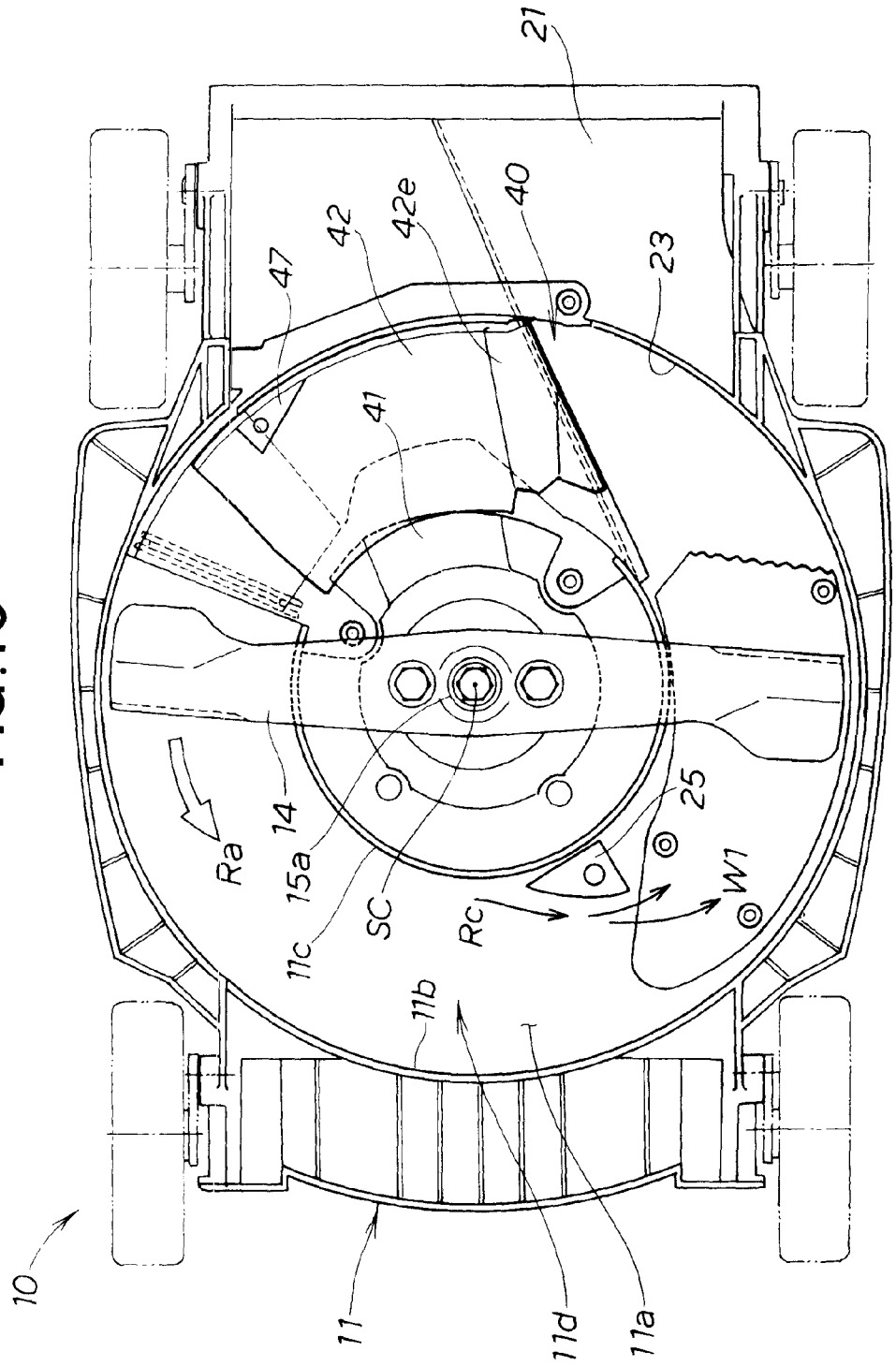
FIG. 15 is a view showing the shutter body of FIG. 5 placed in a fully open position.

Next, the overall action of the lawnmower 10 having the above-described configuration will be described. FIGS. 11 and 12 correspond to FIG. 9. FIGS. 13 through 15 correspond to FIG. 5.

FIGS. 9 and 13 show that the shutter body 42 is operated to the fully closed position (open position 0%) by setting the operating lever 44 to the fully closed position. The passage opening 23 is closed by the shutter body 42, whereby the lawnmower 10 is set to the formation used in mulching mode, the grass cut by the cutting blade 14 (the cut grass) can be cut even finer within the housing 11, and the grass can be discharged out below the housing 11.

FIGS. 11 and 14 show that the shutter body 42 has been operated to a half-open position (open position 50%) by setting the operating lever 44 to the half-open position. By opening the passage opening 23 to the desired open position by the shutter body 42, the lawnmower 10 can be set to the formation used in intermediate mode (the intermediate mode between the bagging mode and the mulching mode), and some of the cut grass can be returned to the ground surface while the rest can be stored in the cut grass storage container 22 (see FIG. 1).

FIGS. 12 and 15 show that the shutter body 42 has been operated to the fully open position (open position 100%) by setting the operating lever 44 to the fully open position. By fully opening the passage opening 23, the lawnmower 10 can be set to the formation used in the bagging mode, and the cut grass can be stored in the cut grass storage container 22 (FIG. 1).

Thus, the lawnmower can be suitably switched between: (1) a bagging mode in which the shutter body 42 is fully open and the cut grass is stored in the cut grass storage container 22, (2) a mulching mode in which the shutter body 42 is fully closed and the cut grass is discharged out below the housing 11, and (3) an intermediate mode between the bagging mode and the mulching mode in which the shutter body 42 is set to a desired open position.

Furthermore, by operating the shutter body 42 to a desired open position, the manner in which cut grass is discharged can be precisely set as desired according to the state of the lawn Gr (FIG. 1), the finished mowed conditions, and the user's preferences. Furthermore, the amount of discharged flowing cut grass which is discharged from the housing 11 to the cut grass storage container 22 can be reduced by switching to the intermediate mode. As a result, the cut grass remains in the cut grass storage container 22 for a longer amount of time, and the frequency with which the cut grass storage container 22 is replaced can therefore be reduced.

Next, the action of the lawnmower 10 with a guide member 25 provided to the housing 11 will be described.

In the bagging mode shown in FIG. 15, the cutting blade 14 rotates around the shaft 15a (the output shaft 15a) and cuts grass, and a revolving flow centered around the output shaft 15a is created inside the housing 11. The grass that has been cut (the cut grass) is made to revolve around the output shaft 15a inside the housing 11 by the revolving flow, and is delivered to the cut grass conveyor passage 21.

The farther from the axis SC, the faster the revolving speed when the cut grass is moved in a revolving motion within the housing 11 by the rotation of the cutting blade 14. In other words, the speed of the revolving flow in the external periphery of the housing 11 is faster than the speed of the revolving flow in the vicinity of the output shaft 15a. Specifically, the speed of the flow revolving through the passage 11d (scroll part 11d) having a substantially annular shape in a plan view is the slowest in the vicinity of the internal cylinder 11c. The guide member 25 is disposed in the inside corner 11f (see FIG. 7) where the speed is low or in the vicinity of the corner. The guide member 25 guides the cut grass revolving at a low speed around the output shaft 15a into the cut grass conveyor passage 21 while guiding the cut grass to the external periphery of the housing 11 (toward the external cylinder 11b) where the revolving speed is fast.

Therefore, since the revolving cut grass flows smoothly, the cut grass can be efficiently prevented from stopping around the output shaft 15a (known as grass buildup). Since the problem of grass buildup can be resolved, the lawnmower 10 can be cleaned and inspected less frequently. Moreover, the revolving speed of substantially all of the cut grass is a high speed. Substantially all of the cut grass can be quickly delivered from the housing 11 to the cut grass conveyor passage 21 and efficiently stored in the cut grass storage container 22 (FIG. 1). As a result, the storage performance with which the cut grass is stored in the cut grass storage container 22 can be improved. Moreover, a simple configuration in which merely the guide member 25 is provided inside the housing 11 is sufficient.

The following is a description of the action of a lawnmower 10 having a shutter mechanism 40 and a kicker 47 in addition to the guide member 25 in the housing 11.

The kicker 47 is positioned either in the external peripheral area of the housing 11 or in proximity thereto, and the kicker guides the flow of the cut grass downward while adjusting the flow of the cut grass, which revolves within the housing 11. The cut grass is discharged out below the housing 11 by switching the shutter mechanism 40 to the mulching mode shown in FIG. 13. Furthermore, the flow of cut grass revolving within the housing 11 is led to the bottom of the housing 11 by the kicker 47. Therefore, when the lawnmower 10 is used in the mulching mode, the cut grass can be efficiently discharged out below the housing 11. During the mulching mode, the guide member 25 guides the cut grass revolving at a low speed around the output shaft 15a within the housing 11 to the external periphery of the housing 11.

Thus, since both the guide member 25 and the kicker 47 are disposed inside the housing 11, the flow of the cut grass revolving within the housing 11 can be distributed so as to be uniform during the mulching mode. Moreover, the problem of grass buildup can be prevented by the guide member 25. Therefore, the cut grass can be efficiently discharged out below the housing 11. The shutter body 42 closes off the cut grass conveyor passage 21 in the mulching mode. At this time, the kicker 47 and the shutter body 42 together are in a position of closing off the cut grass conveyor passage 21, which is not actually necessary because the lawnmower is not in the bagging mode.

Alternatively, switching the shutter mechanism 40 to the bagging mode shown in FIG. 15 causes the shutter mechanism 40 to move so as to deliver cut grass from the housing 11 to the cut grass storage container 22. At this time, the kicker 47 moves together with the moveable components 41, 42 of the shutter mechanism 40.

In other words, when the shutter body 42 has moved away from the position of the cut grass conveyor passage 21 (the cut grass conveyor passage 21 has been opened), the kicker 47 moves together with the shutter body 42 to a position of not affecting "the flow of cut grass from the housing 11 into the cut grass conveyor passage 21." Therefore, in the bagging mode, the "flow of cut grass from the housing 11 into the cut grass storage container 22" is not hindered by the kicker 47. Consequently, when the lawnmower 10 is used in the bagging mode, the cut grass can be efficiently stored in the cut grass storage container 22 (FIG. 1).

Furthermore, since the kicker 47 is provided to the small-sized moveable components 41, 42 in the shutter mechanism 40, it is easier to provide the kicker 47 than when the kicker 47 is provided to a large-sized component such as the housing 11, and fewer steps are needed to provide the kicker. Moreover, a large-sized component such as the housing 11 does not need to be machined in any manner.

In the present invention, the drive source is not limited to the engine 15, and the drive source may also be an electric motor, for example.

The cut grass storage container 22 is not limited to a grass bag, and may also be a box, for example.

The shutter body 42 is preferably configured so as to be capable of adjusting the open position of the passage opening 23, and the shutter body 42 may have any shape, dimensions, and constituent material.

The guide member 25 and the kicker 47 may have any dimensions and constituent materials.

The lawnmower 10 of the present invention is suitable for use as a rotary lawnmower which can be used in both a bagging mode and a mulching mode.

Obviously, various minor changes and modifications of the present invention are possible in light of the above teaching. It is therefore to be understood that within the scope of the appended claims the invention may be practiced otherwise than as specifically described.

What is claimed is:

1. A lawnmower comprising:
   a cutting blade capable of rotating about a shaft extending substantially perpendicular to a lawn;
   a downwardly-open housing for housing the cutting blade, the housing having a scroll part; and
   a cut grass conveyor passage extending rearwardly from the housing and designed to allow attachment of a cut grass storage container thereto, the grass cut by the cutting blade being delivered to the cut grass conveyor passage while revolving about a shaft within the housing,
   wherein the housing has a movable shutter mechanism, a first non-movable guide member and a second non-movable guide member provided therein, when the first guide member is viewed from a housing bottom side, the first guide member has an outer surface which tapers downwardly toward the housing bottom side in a direction opposite a direction in which the grass revolves for guiding the grass revolving about the shaft toward an outer periphery of the housing while also guiding the grass to the cut grass conveyor passage, the first guide member being positioned upstream of the second guide member in the direction in which the grass revolves.

2. The lawnmower of claim 1, wherein the housing comprises a substantially horizontal top wall, an external cylinder and an internal cylinder disposed around the shaft and extending downward from the top wall, and an annular space defined by the top wall, the external cylinder and the internal cylinder,
the annular space defining the housing scroll part and is formed so that cut grass is directed to the cut grass conveyor passage while revolving, and
the first guide member is disposed in the space at a corner between the top wall and the internal cylinder or in proximity to the corner.

3. The lawnmower of claim 2, wherein the first guide member is formed into a triangular shape having a tapering distal end disposed in the corner, a side extending along an external side of the internal cylinder to a rear end, the side being inclined so that the distal end is nearest to the housing top wall and the rear end is spaced from the housing top wall, and a remaining end disposed away from the external side of the internal cylinder.

4. The lawnmower of claim 1, wherein
the shutter mechanism is capable of being switched between a bagging mode in which the cut grass conveyor passage is opened so that the grass is delivered from the housing to the cut grass storage container, and a mulching mode in which the cut grass conveyor passage is closed so that the grass is discharged out below the housing, and
a kicker is provided on the shutter mechanism and is movable therewith for regulating the revolving flow of the grass within the housing and guiding the grass to a bottom of the housing during the mulching mode, and is disposed inside the housing in a section close to the external periphery of the housing or in proximity to the section.

5. The lawnmower of claim 3, wherein both the distal end and the remaining end are adjacent the housing top wall.

6. The lawnmower of claim 4, wherein the shutter mechanism includes shutter body configured to at least partially rotate about an axis of the shaft, the shutter body selectively opening and closing an opening of the conveyor passage, the shutter body having a horizontal section extending toward an external cylinder of the housing and a vertical section extending from a distal end of the horizontal section, a corner between the horizontal section and the vertical section mirroring an outside corner of the housing scroll part.

7. The lawnmower of claim 6, wherein the kicker is positioned in proximity to the corner of the shutter mechanism and is formed into a triangular shape which tapers in a direction opposite a direction in which the grass revolves.

8. The lawnmower of claim 7, wherein the kicker has a tapering distal end positioned in the corner, a side extending along an external side of the vertical section to a rear end, the side being inclined so that the distal end is nearest to the horizontal section and the rear end is spaced from the horizontal section, and a remaining end disposed away from the vertical section and spaced from the horizontal section.

9. The lawnmower of claim 1, wherein the second guide member is positioned closer to the conveyor passage than the first guide member and has a guiding-direction rear edge facing an opening of the conveyor passage.

10. The lawnmower of claim 9, wherein the second guide member is provided on a bottom side of the housing and shaped such that a cross-sectional shape of the housing passing through an axis of the shaft is substantially uniform between a portion of the housing having the scroll part and a portion of the housing not having the scroll part.

11. A lawnmower comprising:
a cutting blade capable of rotating about a shaft extending substantially perpendicular to a lawn;
a downwardly-open housing for housing the cutting blade, the housing having a substantially horizontal top wall, an external cylinder and an internal cylinder disposed around the shaft and extending downward from the top wall, and an annular space defined by the top wall, the external cylinder and the internal cylinder; and
a cut grass conveyor passage extending rearwardly from the housing and designed to allow attachment of a cut grass storage container thereto, the grass cut by the cutting blade being delivered to the cut grass conveyor passage while revolving about a shaft within the housing,
wherein the housing has a first guide member disposed in the space at a corner between the top wall and the internal cylinder or in proximity to the corner, the first guide member being formed into a triangular shape having a tapering distal end disposed in the corner, a side extending along an external side of the internal cylinder to a rear end, the side being inclined in a direction opposite a direction in which the grass revolves so that the distal end is nearest to the housing top wall and the rear end is spaced from the housing top wall, and a remaining end disposed away from the external side of the internal cylinder, the first guide member guiding the grass revolving about the shaft toward an outer periphery of the housing while also guiding the grass to the cut grass conveyor passage; and
wherein the housing has a kicker for regulating the revolving flow of the grass within the housing, the kicker being disposed in a portion of the annular space which is diametrically opposed to that portion of the annular space having the first guide member.

12. The lawnmower of claim 11, wherein the remaining end of the first guide member is in contact with the housing top wall.

13. The lawnmower of claim 11, further comprising:
a shutter mechanism provided in the housing and capable of being switched between a bagging mode in which the cut grass conveyor passage is opened so that the grass is delivered from the housing to the cut grass storage container, and a mulching mode in which the cut grass conveyor passage is closed so that the grass is discharged out below the housing;
the kicker provided on the shutter mechanism and being formed into a triangular shape which tapers in a direction opposite a direction in which the grass revolves for guiding the grass to a bottom of the housing during the mulching mode; and
a second guide member provided in the housing, the second guide member being separate from the shutter mechanism and positioned between the first guide member and the shutter mechanism, the second guide member having a rear edge facing an opening of the conveyor passage.

* * * * *